No. 781,506. PATENTED JAN. 31, 1905.
M. ERFURT.
PROCESS OF EMULSIFYING RESIN SOAP IN WATER.
APPLICATION FILED NOV. 11, 1902.
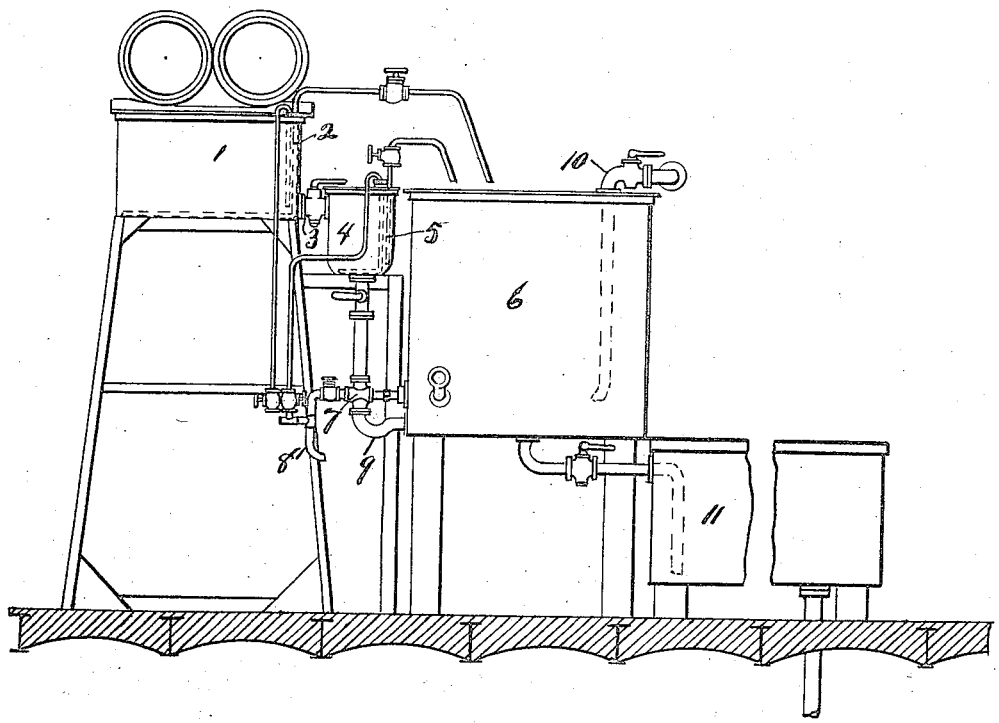

No. 781,506. Patented January 31, 1905.

UNITED STATES PATENT OFFICE.

MAX ERFURT, OF STRAUPITZ, NEAR HIRSCHBERG, GERMANY.

PROCESS OF EMULSIFYING RESIN SOAP IN WATER.

SPECIFICATION forming part of Letters Patent No. 781,506, dated January 31, 1905.

Application filed November 11, 1902. Serial No. 130,897.

*To all whom it may concern:*

Be it known that I, MAX ERFURT, a subject of the Emperor of Germany, residing at Straupitz, near Hirschberg, Silesia, Germany, have invented a new and useful Process for Emulsifying Resin Soap in Water, of which the following is a specification.

The manufacture of sizing out of resin soap—*i. e.*, an emulsion of resin soap with hot water—is the more difficult the more free resin is contained in the resin soap. In the ordinary processes of manufacture separation of raw resin takes place, causes considerable loss of product, and may render the resulting sizing unfit for use.

The present invention now has for its object a process by means of which resin soap with an admixture of as high as one hundred per cent. free resin can readily be emulsified in hot water. The result is a resin soap of a very high percentage of free resin and of correspondingly good gluing properties, also a great saving in alum.

The accompanying drawing is a side elevation of the apparatus employed in my improved process.

In carrying out the invention the resin soap is heated in a suitable receptacle 1 by means of steam-coil 2 or some other appropriate source of heat and is then conducted through the connection 3 into a measuring-receptacle 4, where it is still further heated by a steam-coil 5 or the like. On its further way to the receptacle 6, wherein the emulsifying operation is to take place, the heated resin soap passes through a steam and water mixing device 7, preferably of the injector type, said mixing device or injector being adapted to receive steam through the steam-supply pipe 8. By the steam entering the solution within this mixer or injector the temperature of the resin soap and water solution is still further enhanced, so that the final temperature of about 212° Fahrenheit is obtained. The heated resin soap and water solution is then atomized by means of the steam-pressure behind it within the mixing device, injected into the lime-water contained in the emulsion-vat, and emulsified therein. The water used in the mixer is preferably taken from the emulsion-vat 6 by means of a pipe 9, connected to the mixer or injector and in communication with the vat, the supply of water being steadily fed to the vat by a supply-pipe 10 for the purpose of keeping up active agitation, thereby aiding the emulsifying process. The result of the described process is a non-settling sizing, which is next conducted into the reservoirs, from where it is run off into the rag-engine.

In place of the steam-injector I may see fit to employ a suitable force-pump or the like.

Although I have described my new process only in the treatment of resin soap, it is obvious that also other products which can be emulsified may be treated in this manner, and in place of lime-water other liquids, such as oil or the like, may be used.

What I claim, and desire to secure by Letters Patent, is—.

Process for emulsifying resin soap in water, consisting in heating resin soap, mixing it with water under steam-pressure and injecting the heated mixture in atomized state into lime-water, for the purpose of bringing about perfect emulsion, substantially as described.

In testimony that I claim the foregoing as my invention I have signed my name in presence of two subscribing witnesses.

MAX ERFURT.

Witnesses:
CHEMNITZ H. SCHILLING,
PAUL ARRAS.